Dec. 5, 1939.　　　　K. K. PROBST　　　2,182,387
CLUTCH
Filed July 2, 1937　　　2 Sheets-Sheet 1
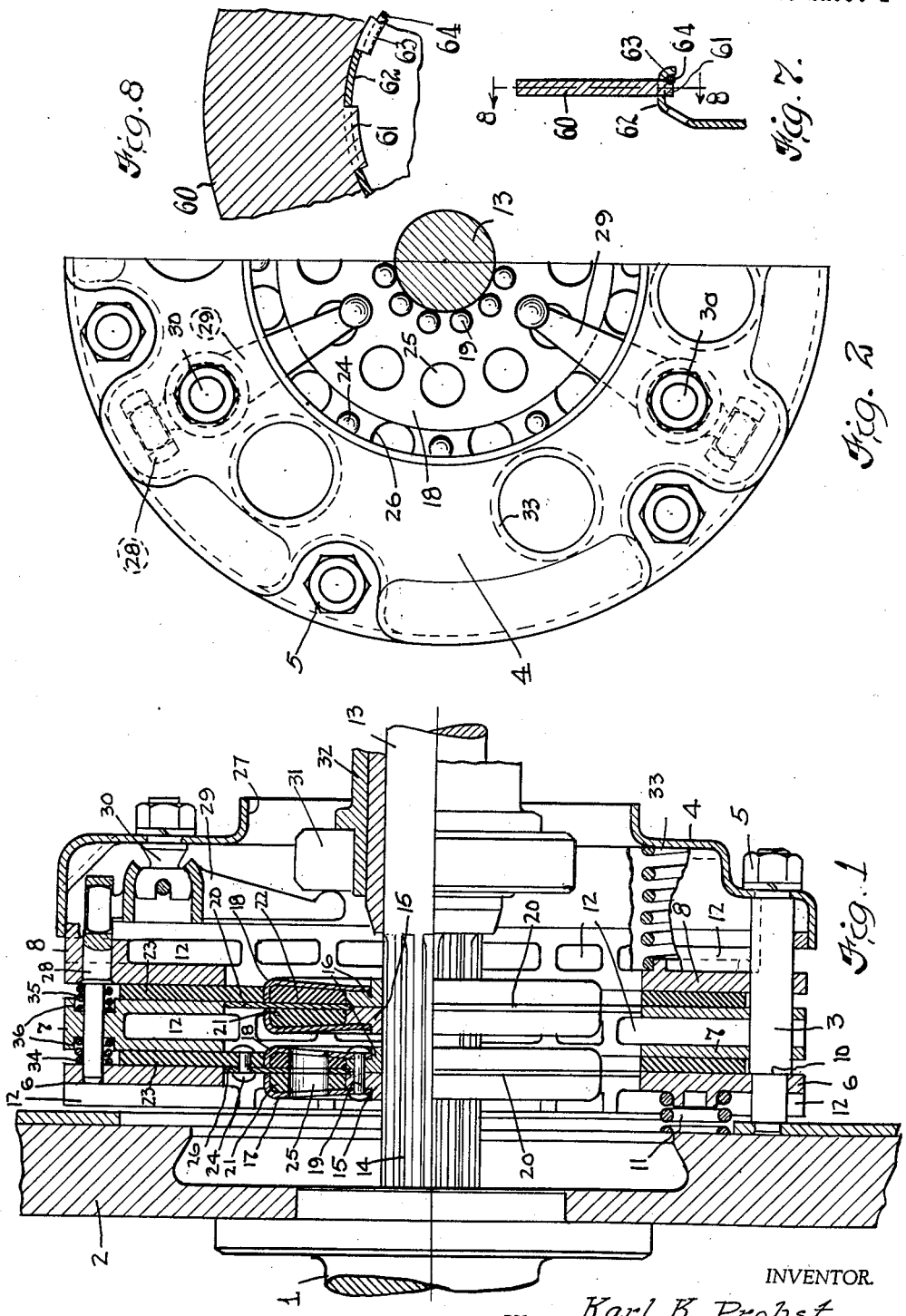
INVENTOR.
Karl K. Probst
BY Fay, Oberlin & Fay
ATTORNEYS.

Dec. 5, 1939.  K. K. PROBST  2,182,387
CLUTCH
Filed July 2, 1937  2 Sheets-Sheet 2
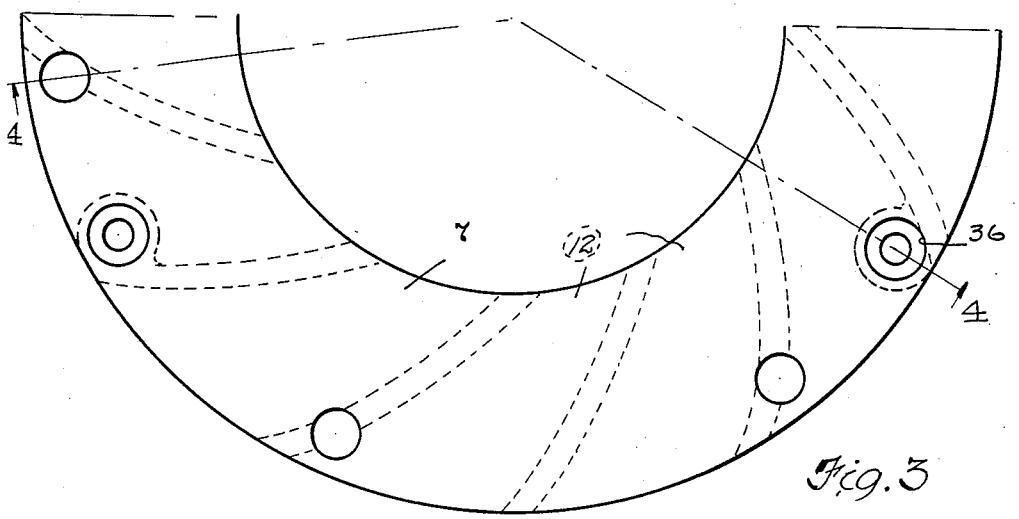
Fig. 3
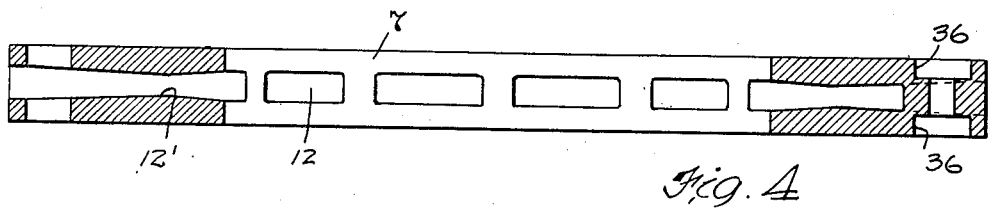
Fig. 4
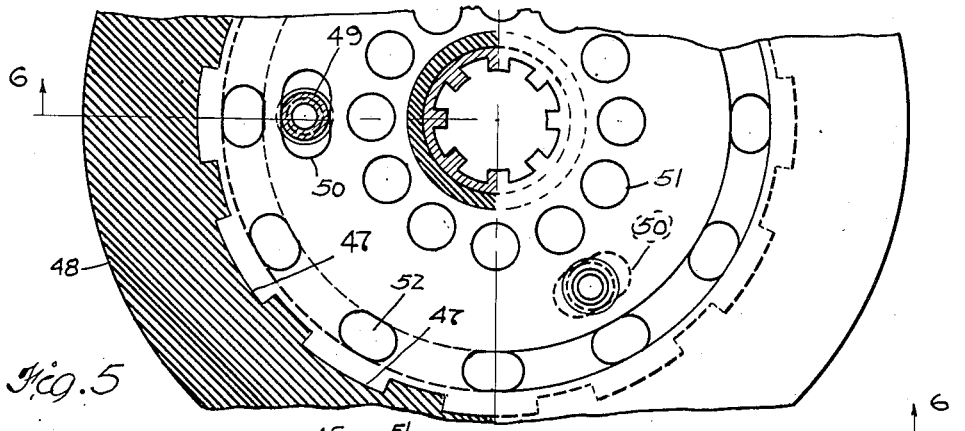
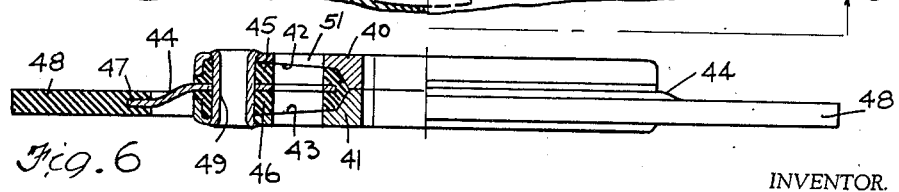
Fig. 6
INVENTOR.
Karl K. Probst
BY Fay, Oberlin & Fay
ATTORNEYS.

Patented Dec. 5, 1939

2,182,387

UNITED STATES PATENT OFFICE 2,182,387

CLUTCH

Karl K. Probst, Detroit, Mich., assignor to Karl K. Probst and J. H. Shoemaker, trustees Application July 2, 1937, Serial No. 151,705

12 Claims. (Cl. 192—69)

The present invention relates to a clutch construction particularly adapted for use in an automotive vehicle. Since in such a vehicle the driven parts of the clutch are connected to the transmission or change gear unit, the weight and inertia of such parts become a factor in the shifting of gears; the greater the inertia of the driven parts of the clutch, the more likely will there occur a clashing of the gears during shifting and accordingly the latter operation is rendered more difficult.

It is therefore one of the objects of my invention to provide a clutch construction wherein the weight and the inertia of the driven parts is substantially reduced as compared to automotive clutches heretofore used.

Another object of the invention is to provide means for ventilating or cooling the parts of the clutch which are in frictional engagement and therefore subject to heating by friction. Such ventilating or cooling of the parts subject to frictional heating and wear also results in the production of longer life, and the prevention of roughness of the parts due to wear which in turn causes slippage in the clutch operation.

Still another object is to provide novel means for building up, or gradually applying, the clutch engagement pressure in order to eliminate jerking and to promote smooth and even engagement of the driving and driven parts. Additional objects and advantages of my invention shall become apparent as the following description proceeds.

To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:

Fig. 1 is a longitudinal sectioned view taken through a clutch construction embodying the principle of my invention; Fig. 2 is a half plan view of the right hand end of Fig. 1; Fig. 3 is a half plan detail view of one of the driving or pressure plates embodied in the construction of Fig. 1; Fig. 4 is a sectional view, taken through a pressure plate, showing a modified form of construction and taken substantially along line 4—4 of Fig. 3; Fig. 5 is a fragmentary, partially sectioned plan view of a driven plate and showing a modified form of construction; Fig. 6 is a partially sectioned, plan view taken substantially along line 6—6 of Fig. 5; Fig. 7 is a detail sectional view of an alternative form of construction of the friction facing ring and the driven disc; and Fig. 8 is a sectional view taken substantially along line 8—8 of Fig. 7.

Now referring more particularly to the drawings, there is shown there the end 1 of a crankshaft leading from an internal combustion engine and carrying the flywheel 2. A series of driving pins or studs 3 extend laterally from the face of the flywheel 2. A cover plate 4 is mounted on the end of the studs 3 by means of the nuts 5. Pressure or driving plates 6, 7 and 8 have a series of openings around their periphery for receiving the studs 3. The driving plate 6 which is mounted adjacent the flywheel 2 is adapted to abut against a shoulder 10 on the studs 3 which serves as a limit stop for preventing the plate 6 from moving any further toward the remainder of the plates. Coil springs 11 (only one of which is shown in Fig. 1) are mounted between the flywheel 2 and the driving plate 6 and urge the latter against the shoulders 10. The shoulders 10 are so spaced from the face of the flywheel 2, that there is a slight clearance, of about $\tfrac{1}{16}$ of an inch between the left hand or inner face of the driving plate 6 and the face of the flywheel 2. In other words, the driving plate 6 has about $\tfrac{1}{16}$ of an inch movement towards and away from its abutting position against the shoulders 10.

Each of the driving plates 6, 7 and 8 have interior passages 12 which are radially curved as seen in Fig. 3, whereby the driving plates 6, 7 and 8 function as centrifugal or sirocco fans for drawing ventilating and cooling air through the clutch assembly. As shown in Fig. 4, the passages 12 may have a constricted throat as indicated at 12', thus having a Venturi tube-like cross section for the purpose of increasing the velocity of the air passing through the passages 12 and thereby increasing the cooling effect.

The driven shaft 13 is mounted in axial alignment with the end of the crankshaft 1 and the flywheel 2 may be provided with a pilot bearing (not shown) for supporting the left hand end of the driven shaft 13. A splined portion 14 on the driven shaft 13 carries and slidably engages with the divided hub portions 15 and 16 of the driven plates.

Divided housing portions 17 and 18 are secured to the divided hub portions 15 and 16 by means of the rivets 19. The rivets 19 also, of course, function to fasten the divided hub portions 15 and 16 together. A disc 20 is mounted between the divided hub portions 15 and 16 and the divided housing portions 17 and 18 and is joined to the latter by means of the rubber mountings 21 and 22 which are vulcanized to the surfaces of the metal parts. The outer periphery of the discs 20 terminate at the inner periphery of the driving plates 6, 7 and 8 and carry the friction facing rings 23, through the medium of the fastening rivets 24. The facing rings 23 are composed of a suitable non-metallic friction material and extend between the driving plates 6, 7 and 8.

It will be noted that the divided housing portions 17 and 18 flare outwardly from the hub portions 15 and 16, so that the rubber mountings 21 and 22 are of increasing cross-sectional thickness from their inner to outer portions. Such increase in the cross-sectional thickness of the rubber mountings 21 and 22 compensates for the variation in the deflection to which they are subjected during operation, since the deflection increases in proportion to the distance from the center of the driven shaft 13.

By limiting the extent of the metal discs 20 to the inner periphery of the driving plates 6, 7 and 8, not only is the weight of the driven plates substantially reduced, but also the entire surface of the friction rings 23 is available for use due to the eliminating of rivet holes which would otherwise be necessary for attaching such facing rings to a co-extensive metal disc. Furthermore, since the discs 20 do not extend between the driving plates 6, 7 and 8 where the majority of the heat of friction is developed, the possibility of conducting heat from this point to the rubber mountings 17 and 18 due to the greater thermoconductivity of metal, is eliminated.

Openings 25 extend through the housing portions 17 and 18, the discs 20 and the rubber mountings 21 and 22. Additional openings 26 extend through the friction facing rings 23 and the discs 20. The openings 25 and 26 permit the cooling air, which is drawn in through the flanged opening 27 of the cover plate 4, to circulate through the driven plates and to pass through both of these plates particularly to the passages 12 in the driving plates 6 and 7. The passages 25 through the rubber mountings 21 and 22 are of additional importance in that they serve to maintain a lowered temperature in the body of the rubber of such mountings, which heating tendency is caused by the vibration periods of the crankshaft which tend to set up a hysteresis in the rubber, particularly at high speeds.

Eyebolts 28 are carried by the pressure plate 8 and extend through the other driving plates 6 and 7. Operating levers 29 have one end attached to the eyebolts 28 by means of a ball and socket joint and are fulcrumed by means of another ball and socket joint on the fulcrum studs 30. The inner ends of the levers 29 are contacted by the throw-out collar or bearing 31 mounted upon the slidable sleeve 32 on the driven shaft 13.

Pressure springs 33 are mounted between the cover plate 4 and the driving plate 8 and serve as means for packing the driving plates 6, 7 and 8 against the driven members or the friction rings 23.

Spacer springs 34 and 35 are mounted between the driving plates 6, 7 and 8 and around the shank of the eyebolts 28. Seats 36 are provided in each side of the central driving plate 7 for the springs 34 and 35. The spacer springs 35 serve the function of not only maintaining the relative radial alignment of the driving plates 6, 7 and 8, but also aid in maintaining a uniform and simultaneous axial movement of these plates into and out of engagement with the friction facing rings 23 or driven plates.

The pressure springs 33 are substantially stronger, and therefore exert a greater total spring pressure than the springs 11. Thus, for example, the pressure springs 33 may exert a spring pressure of 720 pounds, while the springs 11 exert a pressure of 300 pounds. In this specific example, the pressure of the springs 11 is about 40% of the pressure of the springs 33. The proportion of these relative spring pressures can be conveniently varied in practice from ¼ to ½ or from 25% to 50%. During engagement of the clutch, the levers 29 will initially receive all of the pressure exerted by the springs 33, which force is of course ultimately transmitted to the clutch pedal or other clutch operating device. As soon as the driving plates 6, 7 and 8 come into initial contact with the friction rings 23 of the driven plates, some of the pressure of the springs 33 will be distributed through the plates to the springs 11 which in effect are countersprings. This pressure which is initially transmitted to the plates on their first contact is from zero to 25 pounds. As the levers 29 are further moved to releasing position, or to a position permitting the driving and driven plates to further engage, the pressure of the countersprings 11 will counteract the pressure of the springs 33 until the driving plate 6 abuts against the face of the flywheel 2. Then the entire pressure of the springs 33 will be exerted to pack the driving and driven plates and complete engagement thereof will be attained. It will thus be seen that by virtue of the action of the counter-springs 11, that there is a gradual building up of the packing pressure during engagement of the driving and driven plates, so that the entire spring pressure of the pressure springs 33 is not suddenly exerted upon the plates as the levers 29 are released. The counter-springs 11 in effect function as cushioning elements for the full pressure exerted by the pressure springs 33, and thereby eliminate the jerking and grabbing effect which would otherwise occur if such full pressure were suddenly applied to the plates.

This function might be differently described as follows: The only time the springs 33 can exert full pressure of say 720 pounds on the plates 6, 7 and 8 is when the reaction to such pressure is 720 pounds. With the plate 6 spaced from the face of the flywheel 2 the reaction pressure is equal to the pressure exerted by the springs 11 which is, say, 300 pounds. Therefore, until the springs 11 are compressed and the plate 6 moved into engagement with the face of the flywheel 2, the pressure exerted against the plates 6, 7 and 8 cannot exceed 300 pounds, or the reaction pressure. When the plate 6 engages the face of the flywheel 2, it is in engagement with a positive abutment, the reaction pressure becomes equal and opposite to the pressure of springs 33, and the full force of the springs 33 becomes effective to pack the plates. During the initial stage of engagement the springs 11 are the determining factor as to the reaction force, and obviously springs might be substituted therefor which are capable of exerting a different pressure, for the purpose of varying the initial engagement pressure.

The last described structure and its mode of operation is of further advantage in that it permits the engaging surfaces of the driving plates to be made in simple plane surface form without necessitating various cushioning expedients such as the warping, bowing and crimping of the driven plates, or the insertion of additional spring elements in the driven plates.

In the alternative form of construction shown in Figs. 5 and 6, the divided hub portions and housing portions are made integral, as indicated at 40 and 41. The inner walls 42 and 43 of the divided portions 40 and 41 are outwardly divergent for the purpose of providing the tapered or increasing thickness of the rubber mounting rings 45 and 46. The disc 44 is vulcanized to the rubber mounting rings 45 and 46 and carries the friction facing ring 48 by means of the series of projections 47 impeded in the ring 48.

Hollow rivets 49 extend through the disc 44, the rubber mountings 45 and 46 and fasten the members 40 and 41 together. The openings 50 through the disc 44 and the rubber mountings 45 and 46 are elongated so that there is a lost motion, positive connection between the hub elements 40 and 41 and the disc elements 44 and 48. In this manner the hollow rivets 49 and the elongated slots or openings 50 serve as means for positively limiting the yieldable movement of the rubber mountings 45 and 46. The hollow rivets 49 also serve as additional means, together with the openings 51 and 52, for permitting the passage of cooling and ventilating air through the driven plate.

In the alternative form of construction of the friction facing ring and the driven disc as shown in Figs. 7 and 8, the friction facing ring 60 has a series of inwardly extending projections or teeth 61 which are adapted to extend into and through slots in the laterally or axially extending flange 62, on the outer periphery of the driven disc. There is an inwardly turned edge 63 on the flange 62, and a spring locking wire or ring 64 is adapted to fit in between the side of the projection 61 and the inwardly turned edge 63 for holding the facing ring 60 tight against the driven disc. In this manner the facing ring 60 may be removed and new ones installed merely by forcing out the locking ring 64 and axially sliding the facing ring 60 to a point where the projections 61 clear the flange 62.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a clutch, a driven plate comprising a hub, a disc carried by said hub and a friction facing ring attached to said disc, driving plates adapted to engage with said friction facing ring, the outer periphery of said disc terminating at the inner periphery of said driving plates, said hub including divided housing portions on each side of said disc, each of said housing portions comprising integral flange and hub portions, and a rubber mounting joining said disc to said housing portions.

2. In a clutch, a driven plate comprising a hub, a disc carried by said hub and a friction facing ring attached to said disc, driving plates adapted to engage with said friction facing ring, the outer periphery of said disc terminating at the inner periphery of said driving plates, said hub including divided housing portions on each side of said disc, a rubber mounting joining said disc to said housing portions, and air openings passing through said housing portions, said rubber mounting, and said disc.

3. In a clutch, a driven plate comprising a hub, a disc carried by said hub and a friction facing ring attached to said disc, driving plates adapted to engage with said friction facing ring, the outer periphery of said disc terminating at the inner periphery of said driving plates, said hub including divided housing portions on each side of said disc, each of said housing portions comprising integral flange and hub portions, and a rubber mounting joining said disc to said housing portions, said rubber mounting being of increasing cross-sectional thickness from its inner to outer portions.

4. In a clutch, a driven plate comprising a hub, a disc carried by said hub and a friction facing ring attached to said disc, driving plates adapted to engage with said friction facing ring, the outer periphery of said disc terminating at the inner periphery of said driving plates, said hub including divided housing portions on each side of said disc, each of said housing portions comprising integral flange and hub portions, and a rubber mounting joining said disc to said housing portions, the inner walls of the flange portions of said housing portions being flared outwardly whereby said rubber mounting is of increasing cross-sectional thickness from its inner to outer portions.

5. In a clutch, a driven plate comprising a hub, a disc carried by said hub and a friction facing ring attached to said disc, driving plates adapted to engage with said friction facing ring, the outer periphery of said disc terminating at the inner periphery of said driving plates, said hub including divided housing portions on each side of said disc, each of said housing portions comprising integral flange and hub portions, a rubber mounting joining said disc to said housing portions, and lost motion fastening means between said housing portions and said disc.

6. In a clutch, a driven plate comprising a hub, a disc carried by said hub and a friction facing ring attached to said disc, driving plates adapted to engage with said friction facing ring, the outer periphery of said disc terminating at the inner periphery of said driving plates, said hub including divided housing portions on each side of said disc, a rubber mounting joining said disc to said housing portions, and hollow fasteners engaging with said housing portions and extending through elongated slots in said disc and in said rubber mounting.

7. In a clutch, the combination of a plurality of driving plates and driven plates mounted therebetween, means supporting said driven plates comprising a hub and torsionally resilient means connecting the hub and plate, spring means mounted against one side of said driving plates for packing them into engagement with said driven plates, relatively lighter spring means mounted against the other side of said driving plates tending to counteract the spring pressure of said first-named spring means, and separating springs mounted between said driving plates and exerting a spring pressure opposing that of both of said aforementioned spring means.

8. In a clutch, the combination of a plurality of driving plates and driven plates mounted therebetween, spring means mounted against one side of one of said driving plates for packing them into engagement with said driven plates, and relatively lighter spring means mounted against the other side of one of said driving plates tending to counteract the spring pressure of said first-named spring means, said lighter spring means being adapted to vary engaging pressures from zero up to one-fourth to one-half the total pressure of said first-named spring.

9. In a clutch, the combination of a plurality of driving plates and driven plates mounted therebetween, means supporting said driven plates comprising a hub and torsionally resilient means connecting the hub and plate, spring means mounted against said driving plates for packing them into engagement with said driven plates, relatively lighter spring means tending to counteract the spring pressure of said first-named spring means, stop means limiting the movement of the outermost plate of said driving plates towards said other plates, and separating springs mounted between said driving plates and exerting a spring pressure opposing that of both of said forementioned spring means.

10. In a clutch, the combination of a plurality of driving plates and driven plates mounted therebetween, means supporting said driven plates comprising a hub and torsionally resilient means connecting the hub and plate, spring means mounted against one side of said driving plates for packing them into engagement with said driven plates, relatively lighter spring means mounted against the other side of said driving plates tending to counteract the spring pressure of said first-named spring means, stop means limiting the movement of the driving plate contacted by said lighter spring means towards said other plates, and separating springs mounted between said driving plates and exerting a spring pressure opposing that of both of said forementioned spring means.

11. In a clutch, a driven plate comprising an annular disc and a friction facing ring, the outer periphery of said disc terminating substantially at the inner periphery of said facing ring, a laterally extending flange on the outer periphery of said disc, inwardly extending projections on said ring, slots in said flange for said projections, and a spring locking ring engaging between the sides of said projections and said flange.

12. In a clutch, the combination of driving plates and driven plates, means supporting said driven plates comprising a hub and torsionally resilient means connecting the hub and plate, spring means urging said plates into engagement, levers for moving said plates out of engagement and also for compressing and releasing said spring means, relatively lighter spring means exerting pressure in a direction opposite to that of said first-named spring means, and adapted to absorb part of the spring pressure of the latter upon release thereof by said levers, abutment means adapted to receive the full pressure of said first-named spring means after release by said levers, and upon overcoming of the pressure of said lighter spring means, stop means limiting the movement of said lighter spring means in a direction away from said abutment means, and separating springs mounted between said driving plates and exerting a spring pressure opposing that of both of said forementioned spring means.

KARL K. PROBST.